United States Patent [19]
Morisawa et al.

[11] Patent Number: 6,014,605
[45] Date of Patent: Jan. 11, 2000

[54] VEHICULAR CONTROL SYSTEM FOR DETECTING ROAD SITUATIONS OF A PLANNED ROUTE

[75] Inventors: Kunio Morisawa; Kuniaki Murakami, both of Toyota, Japan

[73] Assignee: Toyota Jidosha Kabushiki Kaisha, Toyota, Japan

[21] Appl. No.: 08/825,566

[22] Filed: Mar. 31, 1997

[30] Foreign Application Priority Data

Apr. 19, 1996 [JP] Japan ................................. 8-122202

[51] Int. Cl.⁷ ................................................ F16H 61/00
[52] U.S. Cl. ............................................. 701/65; 701/201
[58] Field of Search ............................ 701/208, 51, 55, 701/65, 213, 201, 210

[56] References Cited

U.S. PATENT DOCUMENTS 5,157,609 10/1992 Stehle et al. ........................ 364/424.1
5,716,301 2/1998 Wild et al. .................................. 477/97
5,832,400 11/1998 Takahashi et al. ......................... 701/53

FOREIGN PATENT DOCUMENTS

| 64-69850 | 3/1989 | Japan . |
| 5-16693 | 1/1993 | Japan . |
| 5-266399 | 10/1993 | Japan . |
| 6-85141 | 8/1994 | Japan . |

*Primary Examiner*—Michael J. Zanelli
*Attorney, Agent, or Firm*—Oblon, Spivak, McClelland, Maier & Neustadt, P.C.

[57] ABSTRACT

A vehicular control system for enabling the driver to recognize in advance an obstructing state present in a plan route to be followed by the driver, even if the driver has a poor consciousness or a concentration on the driving operation. The vehicular control system comprises a mechanism for changing the gear stage of the automatic transmission of the vehicle and establishing the shift shock, if the presence of a traffic obstruction such as another vehicle obstructing the run of the vehicle on the plan route is detected, to notify the driver of the presence of another vehicle.

22 Claims, 5 Drawing Sheets

(DOWNSHIFT)

(UPSHIFT)

VEHICULAR CONTROL SYSTEM FOR DETECTING ROAD SITUATIONS OF A PLANNED ROUTE

BACKGROUND OF THE INVENTION

1. Field of the Invention

The present invention relates to a vehicular control system capable of notifying the driver of a state obstructing the run of the vehicle on a plan route to be followed.

2. Related Art

It is desired that the vehicle can smoothly run to a destination. If, however, an obstructing state such as a section under construction or a stagnant section is present on a plan route to be followed to the destination, the run is delayed, or a bypass run is required so that the running plan, as intended by the driver, cannot be pursued. In recent years, therefore, there has been proposed a vehicular control system which is enabled to avoid the obstructing state by detecting the road situations of the plan route in advance by the navigation system and by setting or changing the plan route in accordance with the detected information. One example of this vehicular control system is disclosed in Japanese Patent Publication No. 58141/1994 (i.e., JPB6-58141).

The vehicular control system, as disclosed, comprises: running state detecting means for detecting the running state of the vehicle; a navigation system for detecting the road situations, the running azimuth of the vehicle and the present position of the vehicle and for displaying the detected information graphically; and change means for changing the control pattern of an automatic transmission in accordance with the road information obtained by the navigation system. As a result, the road situations, as detected by the navigation system, are graphically displayed so that the driver is enabled to cope with the obstructing state by recognizing the state of the plan route in advance.

In the vehicular control system as disclosed in the above-specified Publication, however, the driver is made to cope with the obstructing state by viewing the displayed image of the navigation system to recognize the road situations. This makes it impossible to recognize the displayed image visually if the driver has a poor consciousness or a concentration on the driving operation. In this case, the driver may be unable to recognize the obstructing state of the run and may be delayed in coping with the obstructing state to cause a trouble in the run of the vehicle.

SUMMARY OF THE INVENTION

A main object of the present invention is to provide a vehicular control system which enables the driver to recognize beforehand an obstructing state present on a plan route to be followed, even if the driver has a poor consciousness or a concentration on the driving operation.

Another object of the present invention is to provide a system for notifying the driver of the presence of the obstructing state to the run by controlling an automatic transmission to change the behavior of the vehicle.

According to the vehicular control system of the present invention, therefore, if an obstructing factor present on the plan route is detected, the automatic transmission on the vehicle is controlled so that the vehicular behavior such as the driving force is accordingly changed. This enables the driver to know the presence of the obstructing factors.

In the present invention, moreover, the detection of the obstructing factors can be executed on the basis of the present position and the plan route on numerated map data and the situations of the plan route.

In the present invention, still moreover, the control of the automatic transmission for notifying the obstructing factors contains the speed change, the change to a neutral state and a speed change of high shift shocks.

In the present invention, furthermore, in the absence of the operation to avoid the approach to the obstructing factors, the aforementioned controls of the automatic transmission can be repeated, or different controls of the automatic transmission can be executed.

In the present invention, furthermore, if it is detected that the vehicle cannot be stopped on this side of the obstructing factors, the construction can be made such that the automatic transmission is controlled in a state near the neutral state or forcedly braked.

The above and further objects and novel features of the present invention will more fully appear from the following detailed description when the same is read with reference to the accompanying drawings. It is to be expressly understood, however, that the drawings are for purpose of illustration only and are not intended as a definition of the limits of the invention.

DETAILED DESCRIPTION OF THE PREFERRED EMBODIMENTS

Figure 1:
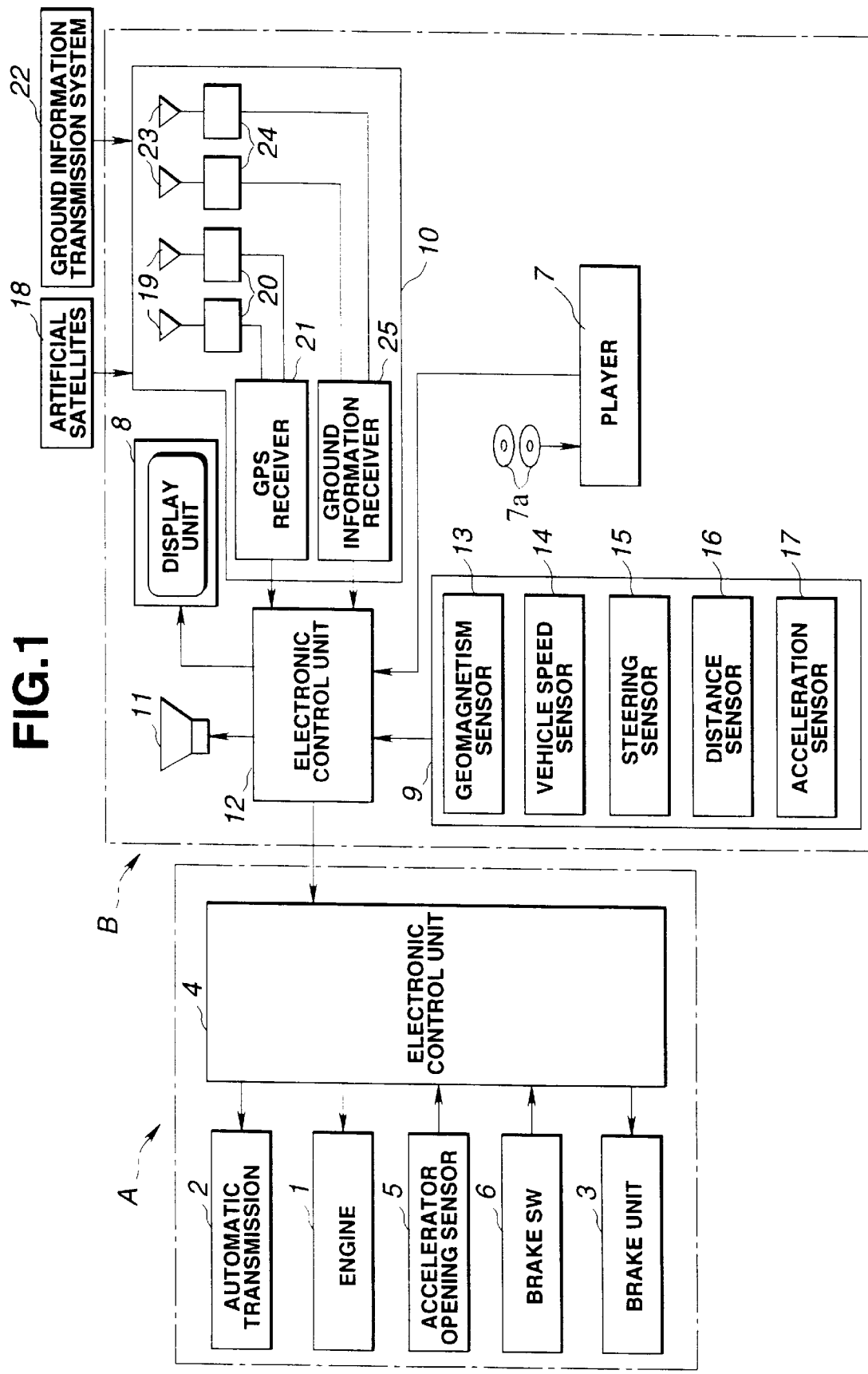
FIG. 1 is a schematic block diagram showing one embodiment of a vehicular control system according to the present invention.

The present invention will be described in more detail with reference to the accompanying drawings. FIG. 1 is a schematic block diagram showing one embodiment of the vehicular control system according to the present invention. This vehicular control system comprises: a driving force control unit A for controlling a driving force; and a navigation system B for detecting road situations.

First of all, here will be described the driving force control unit A. This driving force control unit A is constructed to include an engine 1, an automatic transmission 2 and a brake unit 3. Further included is an electronic control unit (ECU) 4 for controlling those engine 1, automatic transmission 2 and brake unit 3. The engine 1, as used, has the well-known structure which is equipped with an intake/exhaust unit, a fuel injection unit, a lubrication unit and a cooling unit. Incidentally, the engine 1 may be replaced by a motor.

On the other hand, the automatic transmission 2, as used for converting the torque outputted from the engine 1, has the well-known structure which is equipped a torque converter, a planetary gear unit, a frictional engagement unit composed of brakes and clutches, and a shift solenoid valve for controlling the application/release of the frictional engagement unit.

To the electronic control unit 4, on the other hand, there are inputted the signal of an accelerator opening sensor 5 for detecting the stroke of depression of an accelerator pedal, and the signal of a brake switch 6 for detecting the stroke of depression of a brake pedal. Moreover, the brake unit 3 is given not only the function to establish a braking force when the driver operates the brake pedal but also the anti-lock brake system (ABS) function to suppress the slip of the drive wheels by controlling the brake oil pressure of a wheel cylinder on the basis of the rotational situations of the front and rear wheels of the vehicle, as detected by a later-described vehicle speed sensor, and the traction control system (TRC) function to suppress the slip of the drive wheels by controlling them by the combination of the throttle valve of the intake/exhaust unit of the engine 1 and the wheel cylinder.

The aforementioned electronic control unit 4 is exemplified by the microcomputer which is composed mainly of a central processing unit (CPU), a memory unit (RAM and ROM) and an input/output interface, and is stored with shift maps corresponding to a variety of running modes to be selected by the driver or automatically set, such as a normal mode, an economy mode, a power mode, a sport mode, a snow mode and so on. By this electronic control unit 4, moreover, the running states such as the degree of opening of the throttle valve of the engine 1 and the vehicle speed are detected to control the speed changes of the automatic transmission 2 on the basis of the running states detected.

The aforementioned navigation system B is constructed to include: a player 7, which is loaded with an information recording medium 7a such as an optical disk or magnetic disk recording information including map data, for reading the information stored in the information recording medium 7a; and a display unit 8 for displaying the information, as read out by the player 7, in a two- or three-dimensional image. This display unit 8 can be exemplified not only by a liquid crystal display or CRT disposed in the instrument panel or at the side of the glove box in the vehicle compartment but also by an image projecting unit disposed in such a portion of the front shield as exerts no influence upon the field of view.

Further included in the navigation system B are a first locating unit 9 and a second locating unit 10 for detecting the present position of the vehicle and the road situations, and a speaker 11 for notifying the driver of the road situations in voices.

Moreover, these player 7, display unit 8, first and second locating units 9 and 10 and speaker 11 are controlled by an electronic control unit 12. This electronic control unit 12 is exemplified by the microcomputer which is composed mainly of a central processing unit (CPU), a memory unit (RAM and ROM) and an input/output interface.

The aforementioned information recording medium 7a is stored not only with the information necessary for the drive of the vehicle such as maps, place names, roads and main buildings near the roads but also with the specific situations of the roads, that is, straight roads, curves, uphills, downhills, ordinary roads, expressways, unpaved roads, gravel roads, deserts, riverbeds, woodland trails, farm roads and roads of low friction coefficients.

On the other hand, the first locating unit 9 is composed of: a geomagnetism sensor 13 for detecting the azimuth in which the vehicle runs; a vehicle speed sensor 14; a steering sensor 15 for detecting the steering angle of the steering wheel; a distance sensor 16 for detecting the distance between the vehicle and a surrounding object; and an acceleration sensor 17. Moreover, the second locating unit 10 is composed of: a GPS antenna 19 for receiving the radio waves coming from artificial satellites 18; an amplifier 20 connected with the GPS antenna 19; and a GPS receiver 21 connected with the amplifier 20.

This second locating unit 10 is further composed of: an antenna 23 for receiving radio waves from a ground information transmission system 22 disposed on the road sides, at the signals and on the road surfaces of the intersections, such as a ground detection system for detecting an object and transmitting the detection, a beacon or sign post for outputting the road information, the VICS (Vehicle Information & Communication System) or the SSVS (Super Smart Vehicle System); an amplifier 24 connected with the antenna 23; and a ground information receiver 25 connected with the amplifier 24.

By the first locating unit 9 and the second locating unit 10 described above, it is possible to detect the present position on the plan route on the map data, as to be followed by the vehicle, and to detect run-obstructing factors, if any on the route, such as a traffic stagnation or a traffic obstruction. Here, this traffic obstruction is road constructions, snowfalls, landslides, submerged roads, closed roads, rockfalls, fallen trees, or the presence of stopped vehicles, persons or animals at intersections.

Incidentally, in order to improve the running safety, the vehicular control unit thus far described can be additionally given the ASV (Advanced Safety Vehicle) function such as a function to notify the driver of the approach, if any, of the vehicle to a surrounding object by vibrating the seat or a function to expand the air bag if the vehicle comes into contact with the surrounding object. Here will be described control examples of the vehicular control system thus constructed with reference to the flow charts, as shown in FIGS. 2 to 5.

Figure 2:
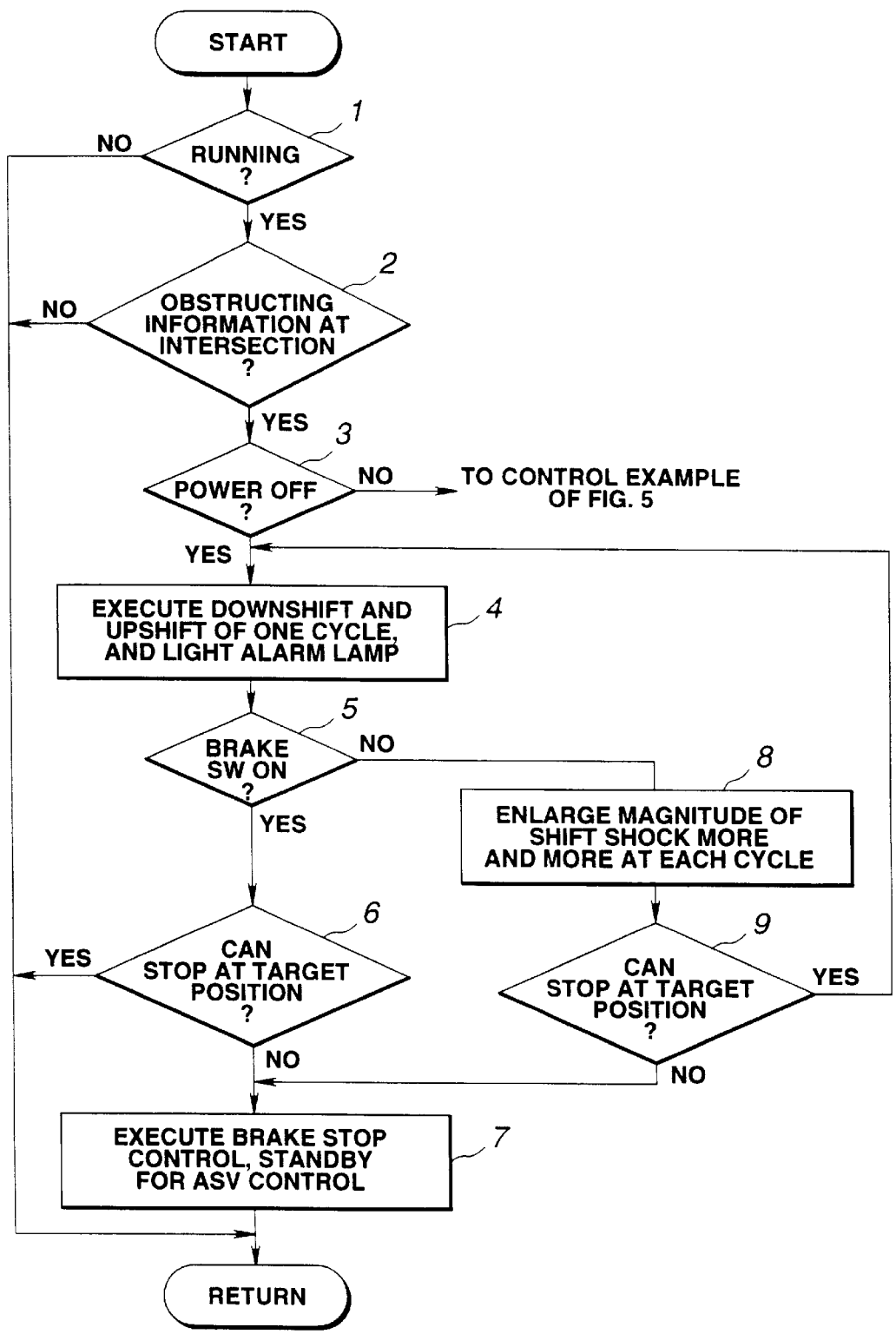
FIG. 2 is a flow chart showing a first control example of the present invention.

Here will be described the first control example. As shown in FIG. 2, the navigation system B is operated by the driver to set not only a destination of the vehicle and the plan route to be followed but also a running mode, and the run of the vehicle is started. Then, the running state such as the vehicle speed or the throttle opening is detected by the electronic control unit 4 so that the shift control of the automatic transmission 2 is executed on the basis of the running state detected.

By the navigation system B, on the other hand, there are the present position of the vehicle and the road situations of the route. It is then decided (at Step 1) by the electronic control unit 4 whether or not the vehicle is running. If the answer of Step 1 is "YES", it is decided (at Step 2) by the navigation system B whether or not the obstructing factors are on the plan route, that is, whether or not there is an intersection of poor visibility or whether or not there is another car stopping at the turned side of a corner.

If the answer of Step 2 is "YES", the throttle valve of the vehicle is returned, and it is decided (at Step 3) by the electronic control unit 4 whether or not the engine is in the power-OFF state. If the answer of Step 3 is "YES", the vehicle speed is suppressed. If the running state is continued as it is, the vehicle may possibly approach another car or the traffic obstruction. In order to prevent this possibility, there is executed one cycle in which the gear stage of the automatic transmission 2 is once shifted down and then shifted up, to establish the shift shock which is caused by the change in the output torque. At the same time, the display unit 8 or the alarm lamp, as disposed on the instrument panel, that is, an alarm indicator is lit to indicate another car (at Step 4). In view of the alarm indicator thus lit, the driver can recognize that the shift shock of the automatic transmission 2 does not come from any trouble. In other words, there are provided shift means and display means for informing the driver visually of the notice of the obstructing factors.

Figure 3:
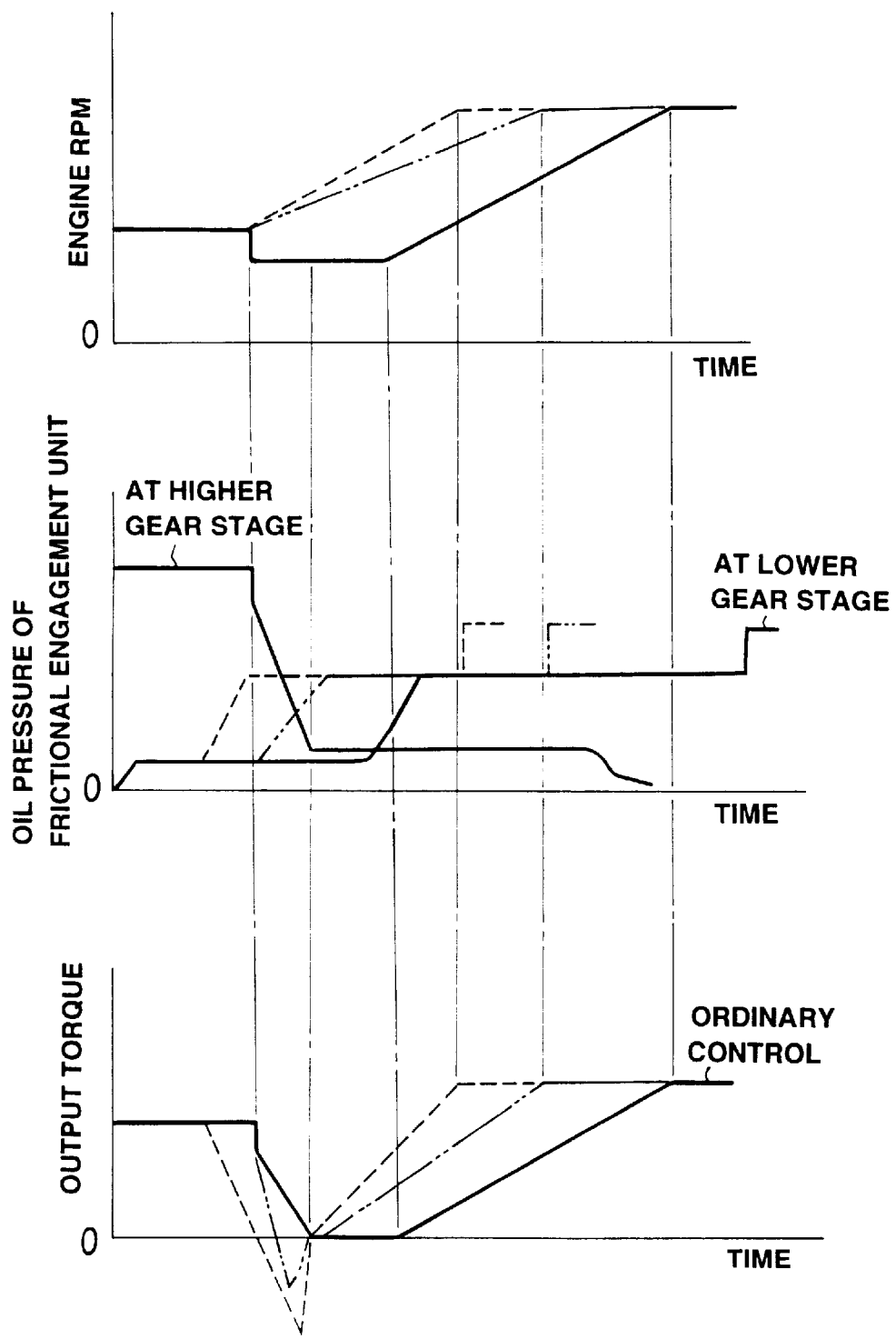
FIG. 3 presents characteristic diagrams illustrating the change in an engine RPM, the change in the oil pressure of a frictional engagement unit of an automatic transmission, and the change in the output torque of the automatic transmission at the time of a downshift of the first control example of the present invention.
Figure 4:
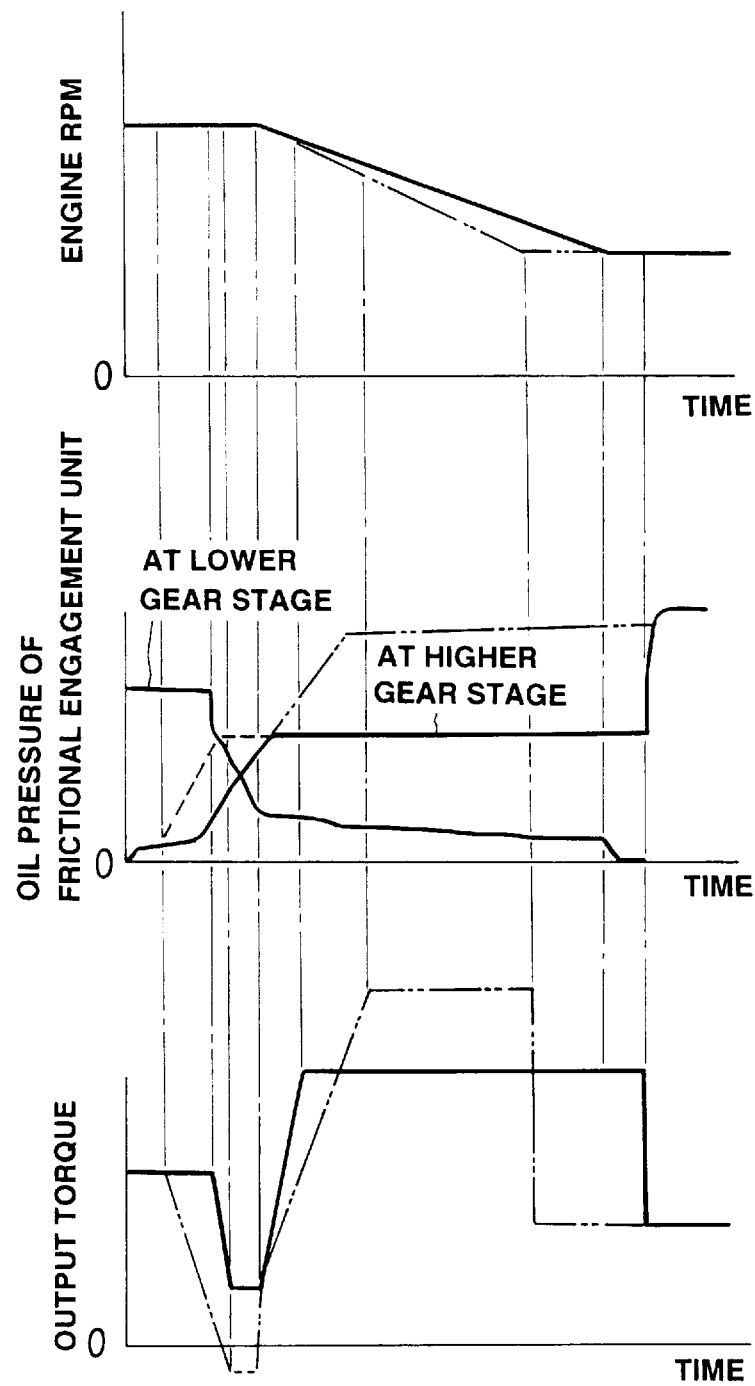
FIG. 4 presents characteristic diagrams illustrating the change in an engine RPM, the change in the oil pressure of a frictional engagement unit of an automatic transmission, and the change in the output torque of the automatic transmission at the time of an upshift of the first control example of the present invention.

FIGS. 3 and 4 present characteristic diagrams illustrating the change in an engine RPM, the change in the oil pressure of the frictional engagement unit of the automatic transmission 2, and the change in the output torque of the automatic transmission 2 at the time of changing the gear stage of the automatic transmission 2, as executed at Step 4. Of these, FIG. 3 presents the state at a downshift of the automatic transmission 2, and FIG. 4 presents the state at an upshift of the automatic transmission 2. In FIGS. 3 and 4, solid lines indicate the case in which the gear stages are changed on the basis of the ordinary shift map, and broken or single dotted lines indicate the case in which the gear stages are changed by the control of the automatic transmission 2, as executed at Step 4.

Specifically, in FIG. 3, the timing of the oil pressure rise of the frictional engagement unit at a lower gear stage, as effected in the control of Step 4, is accelerated from that effected in the ordinary gear stage changing control. In FIG. 4, on the other hand, the timing of the oil pressure rise of the frictional engagement unit at a higher gear stage, as effected in the control of FIG. 4, is accelerated from that effected in the ordinary gear stage changing control.

As a result, no matter whether the gear change might be a downshift or an upshift, the fluctuation in the output torque of the automatic transmission 2 is higher than that of the case of the ordinary gear stage changing control so that the shift shock to be established at Step 4 is higher than that to be established in the ordinary control. This makes it far easier for the driver to recognize the obstructing state. Incidentally, in the case of the so-called "clutch-to-clutch shift", in which the gear stage is changed by applying any one of the frictional engagement units while leaving the others released, the shift shock may be caused by the control in which the clutch at the lower gear stage and the clutch at the higher gear stage are temporarily applied into the tied-up state. In other words, there is provided temporary applied state forming means.

After the notice control described above, it is decided (at Step 5) whether or not the driver has performed the operation to avoid the approach to the obstructing factors, that is, whether or not the brake pedal has been depressed. This operation of this Step 5 corresponds to avoiding operation detecting means. If this answer is "YES", it is decided (at Step 6) by the electronic control unit 4 whether or not the vehicle can be stopped by the braking force of the brake unit 3 at a target position, i.e., at a position on this side of a constant distance from another vehicle. This decision of whether or not the stop is possible is made on the basis of the acceleration of the vehicle, the distance between the vehicle and another, and the braking force of the brake unit 3. In other words, there is provided stop detecting means.

If the answer of Step 6 is "NO", that is, if the braking force is insufficient merely by the depression of the brake pedal by the driver, a forced stop control is executed by raising the brake oil pressure of the brake unit 3 by the electronic control unit 4, and the ASV function is brought into the standby state (at Step 7). Then, the routine is returned. In other words, there is provided brake means.

If the answer of Step 5 is "NO", the driver has failed to recognize the obstructing state or to take any measures although he recognized the obstructing state. Therefore, the automatic transmission 2 is so shifted down and up (at Step 8) as to establish a higher shift shock than that of Step 4. This change in the gear stage is repeated one cycle for every two or three seconds so that the shift shock is increased with the increase in the cycle number.

Figure 5:
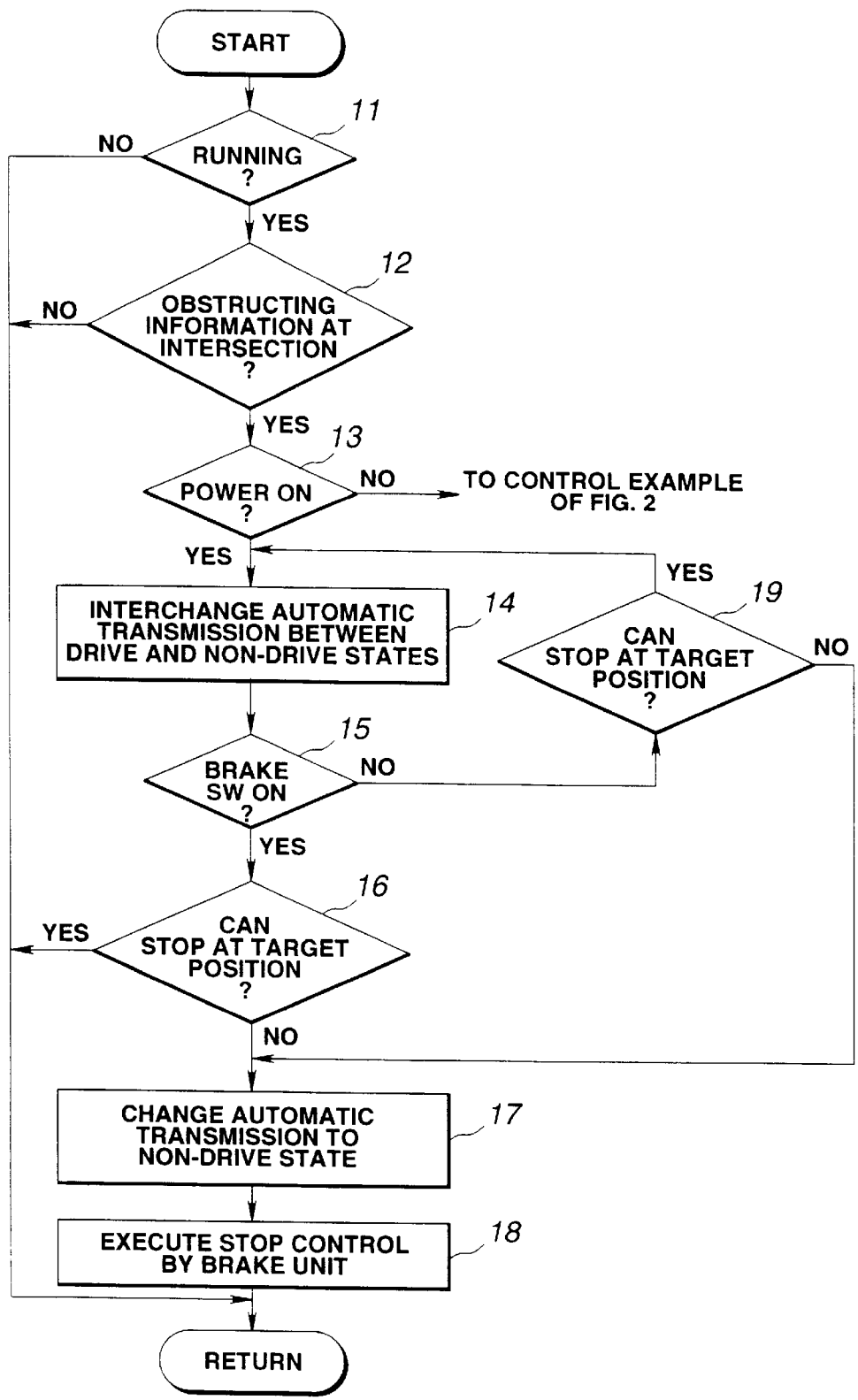
FIG. 5 is a flow chart showing a second control example of the present invention.

It is then decided (at Step 9) whether or not the vehicle can be stopped at the target position. If the answer of Step 9 is "YES", the routine returns to Step 4. If the answer of Step 9 is "NO", the routine advances to Step 7. This Step 9 also corresponds to the stop detecting means. Incidentally, if the answers of Steps 1 and 2 are "NO", there is no possibility in that the run of the vehicle is obstructed. If the answer of Step 6 is "YES", the braking force, as established by the operation of the driver, is sufficient. In either case, therefore, the routine is returned. If the answer of Step 3 is "NO", the control of FIG. 5 is executed because the acceleration is caused by the control in which the automatic transmission 2 is shifted down.

The aforementioned operation of Step 2 corresponds to obstructing state detecting means in the present invention, and the operations of Steps 4 and 8 correspond to obstruction notifying means in the present invention.

Thus, according to the control example of FIG. 2, if another vehicle obstructing the run of the vehicle is detected by the navigation system B, the driver is notified of the obstructing state by the drive state of the atutomatic transmission 2, more definitely, by the shift shock caused by changing the gear stage. As a result, even if the driver has a poor consciousness or a concentration on the driving operation, he is enabled to recognize the obstructing state in advance by feeling the vibration of the vehicle thereby to cope with the obstructing state with ease.

According to the control example of FIG. 2, moreover, if the driver does not depress the brake pedal once he is notified of the obstructing state, the control is made to enlarge the shift shock so that the driver can recognize the degree of the obstructing state thereby to cope with the obstruction more reliably.

Here will be described the second control example according to the present invention. The operations of Steps 11 and 12 appearing in FIG. 5 are similar to those of Steps 1 and 2 of FIG. 2. If the answer of Step 12 is "YES", it is decided (at Step 13) whether or not the engine 1 is in the power ON state. The operation of Step 13 corresponds to power-ON detecting means. If the answer of Step 13 is "YES", the frictional engagement unit such as the clutch, as applied in the automatic transmission 2, is once partially released and restores again the applied states several seconds, e.g., one and half seconds (at Step 14). In other words, there is provided non-drive means. Simultaneously as the driving force of the vehicle is once dropped to zero or lowered, the engine 1 is raced and then returned to the initial drive state, and the alarm informing the obstructing state is lit in the display unit 8 or the instrument panel to notify the driver of the obstructing state.

By this notice, more specifically, the driver is enabled to feel and recognize the obstructing state as the change in the driving force, and it is decided (at Step 15) by the electronic control unit 4 whether or not the operation for coping with the obstructing state is performed, for example, the brake pedal is depressed. This operation of Step 15 corresponds to avoiding operation detecting means. If the answer of Step 15 is "YES", it is decided (at Step 16) whether or not the vehicle can stop at the target position. If the answer of Step 16 is "NO", the frictional engagement unit of the automatic transmission 2 is held in the partially applied state (at Step 17), and the brake unit 3 is controlled by the electronic control unit 4 to establish the braking force (at Step 18). Then, the routine is returned.

If the answer of Step 15 is "NO", it is decided (at Step 19) by the electronic control unit 4 whether or not the vehicle can stop, as it is, at the target position. This operation of Step 19 corresponds to the stop detecting means. The routine returns to Step 14, if the answer of Step 19 is "YES", but advances to Step 17 if "NO".

Incidentally, if the answers of Steps 11 and 12 are "NO", the routine is returned because the run of the vehicle is not probably obstructed. If the answer of Step 16 is "YES", the routine is also returned because the braking force by the braking operation of the driver is sufficient. If the answer of Step 13 is "NO", the control of FIG. 2 can be executed.

The operation of Step 12 corresponds to the obstructing state detecting means in the present invention, and the operations of Steps 14 and 17 correspond to the obstruction notifying means.

Thus, according to the control example of FIG. 5, effects similar to those of the control example of FIG. 2 can be achieved. In addition, if the obstructing state is detected, the automatic transmission 2 is switched to the non-drive state so that the driving force of the vehicle disappears to lower the vehicle speed thereby to make it surer for the driver to recognize the obstructing state.

Incidentally, at Step 5 of the control example of FIG. 2 or at Step 15 of the control example of FIG. 5, the avoiding operation other than the depressing action of the brake pedal, that is, the direction change of the vehicle may be detected by the steering sensor. Thus, the obstruction avoiding operation to be detected is not limited to the depression of the brake pedal.

Alternatively, there may be executed in combination of the change of the gear stage of the automatic transmission 2, as executed in the control example of FIG. 2, and the change from the drive state to the non-drive state of the automatic transmission 2, as executed in the control example of FIG. 5. With this control, moreover, the notification of the obstructing state is executed at two stages by the change in the gear stage of the automatic transmission and by the change in the drive state of the automatic transmission so that the driver can recognize the obstructing state more reliably.

In the control examples of FIGS. 2 and 5, moreover, the object of the obstructing state is exemplified by another vehicle, but the obstructing state detecting means in the present invention may be the means for detecting the traffic stagnations, the road constructions, the snowfalls, the landslides, the submerged roads, the closed roads, the rockfalls, the fallen trees, or the presence of persons or animals.

Here will be generally described the advantages to be obtained by the present invention. According to the present invention, when the obstructing state of the plan route is detected, according to the present invention, even if the driver has a poor consciousness or a concentration on the driving operation, the drive state of the automatic transmission is controlled to change the driving force of the vehicle so that he is enabled to recognize the obstructing state in advance by feeling the vibration of the vehicle thereby to cope with the obstructing state with ease.

According to the present invention, moreover, when the obstructing state is detected, the shift shock is caused by the change in the gear stage of the automatic transmission and felt by the driver so that the obstructing state can be more reliably recognized.

According to the present invention, on the other hand, when the obstructing state is detected, the automatic transmission is changed to the non-drive state to eliminate the driving force of the vehicle thereby to lower the vehicle speed so that the obstructing state can be more reliably recognized.

According to the present invention, moreover, when the obstructing state is detected, the automatic transmission is alternately switched between the drive state and the non-drive state to increase/decrease the driving force of the vehicle so that the obstructing state can be more reliably recognized.

According to the present invention, moreover, when the obstructing state is detected, the controls of the automatic transmission are executed to notify the obstructing state. After this, the automatic transmission is changed to the non-drive state thereby to eliminate the driving force of the vehicle. As a result, the obstructing state is notified at two stages so that the obstructing state can be more reliably recognized.

What is claimed is:

1. A vehicular control system for detecting the road situations of a plan route to be followed by the vehicle and for executing controls including the control of an automatic transmission, mounted on the vehicle, on the basis of the road situations, comprising:

obstructing factor detecting means for detecting the presence of factors for obstructing the run of the vehicle on said plan route; and obstruction notifying means for notifying, every time that the presence of said factors is detected by said obstructing factor detecting means, a driver of the vehicle of the presence of said obstructing factors by controlling a drive state of said automatic transmission, to establish a change of vehicle behavior.

2. A vehicular control system according to claim 1, wherein said obstructing factor detecting means includes means for detecting said plan route and the present position on map data and said obstructing factors on said plan route.

3. A vehicular control system according to claim 1, wherein said obstruction notifying means includes means for lowering the torque transmission in the automatic transmission.

4. A vehicular control system according to claim 1, wherein said obstruction notifying means includes means for executing both the reduction in the torque transmission in the automatic transmission and the restoration of the transmission of the reduced torque consecutively.

5. A vehicular control system according to claim 1, further comprising:

display means for executing a control appealing the visual sense of the driver when said obstruction notifying means executes the control to notify the presence of said obstructing factors.

6. A vehicular control system according to claim 1, wherein said obstructing factor detecting means includes means for detecting a traffic obstruction on said plan route, and wherein said obstruction notifying means includes means for notifying the driver of the presence of said obstructing factors by controlling the drive state of the automatic transmission when the presence of said traffic obstruction is detected.

7. A vehicular control system for detecting the road situations of a plan route to be followed by the vehicle and for executing controls including the control of an automatic transmission, mounted on the vehicle, on the basis of the road situations, comprising:

obstructing factor detecting means for the presence of factors for obstructing the run of the vehicle on said plan route, wherein said obstructing factors include at least one of a traffic stagnation and a traffic obstruction on the roads; and obstruction notifying means for notifying, when the presence of said factors is detected by said obstructing factor detecting means, a driver of the vehicle of the presence of said obstructing factors by controlling a drive state of said automatic transmission.

8. A vehicular control system for detecting the road situations of a plan route to be followed by the vehicle and for executing controls in including the control of an automatic transmission, mounted on the vehicle, on the basis of the road situations, comprising:

obstructing factor detecting means for detecting the presence of factors for obstructing the run of the vehicle on said plan route; and obstruction notifying means for notifying, when the presence of said factors is detected by said obstructing factor detecting means, a driver of the vehicle of the presence of said obstructing factors by controlling a drive state of said automatic transmission, wherein said obstruction notifying means includes means for establishing shocks by changing the output torque of the vehicle.

9. A vehicular control system for detecting the road situations of a plan route to be followed by the vehicle and for executing controls including the control of an automatic transmission, mounted on the vehicle, on the basis of the road situations, comprising:

obstructing factor detecting means for detecting the presence of factors for obstructing the run of the vehicle on said plan route; and obstruction notifying means for notifying, when the presence of said factors is detected by said obstructing factor detecting means, a driver of the vehicle of the presence of said obstructing factors by controlling a drive state of said automatic transmission, wherein said obstruction notifying means includes shift means for executing a downshift and an upshift consecutively in the automatic transmission.

10. A vehicular control system for detecting the road situations of a plan route to be followed by the vehicle and for executing controls including the control of an automatic transmission, mounted on the vehicle, on the basis of the road situations, comprising:

obstructing factor detecting means for detecting the presence of factors for obstructing the run of the vehicle on said plan route; and obstruction notifying means for notifying, when the presence of said factors is detected by said obstructing factor detecting means, a driver of the vehicle of the presence of said obstructing factors by controlling a drive state of said automatic transmission, wherein said obstruction notifying means includes shift means including temporary applied state forming means for temporarily enlarging, at a shifting instant when a predetermined first frictional engagement unit of the automatic transmission is to be applied whereas a second frictional engagement unit is to be released, the transmission troque capacities of the two fictional engagement units to approach an applied state.

11. A vehicular control system according to claim 10, wherein said temporary applied state forming means includes means for executing a feed of an oil pressure to the frictional engagement unit to be applied, faster at the time of notifying said obstructing factors than at other times.

12. A vehicular control system for detecting the road situations of a plan route to be followed by the vehicle and for executing controls including the control of an automatic transmission, mounted on the vehicle, on the basis of the road situations, comprising:

obstructing factor detecting means for detecting the presence of factors for obstructing the run of the vehicle on said plan route;

obstruction notifying means for notifying, when the presence of said factors is detected by said obstructing factor detecting means, a driver of the vehicle of the presence of said obstructing factors by controlling a drive state of said automatic transmission;

stop detecting means for detecting that the vehicle can be stopped at a predetermined position prior to reaching said obstructing factors; and braking means for executing the braking of the vehicle when it is not detected that the vehicle can be stopped before said predetermined position.

13. A vehicular control system for detecting the road situations of a plan route to be followed by the vehicle and for executing controls including the control of an automatic transmission, mounted on the vehicle, on the basis of the road situations, comprising:

obstructing factor detecting means for detecting the presence of factors for obstructing the run of the vehicle on said plan route;

obstruction notifying means for notifying, when the presence of said factors is detected by said obstructing factor detecting means, a driver of the vehicle of the presence of said obstructing factors by controlling a drive state of said automatic transmission;

stop detecting means for detecting that the vehicle can be stopped at a predetermined position prior to reaching said obstructing factors; and non-drive means for lowering the torque transmission in the automatic transmission to a neutral state when it is not detected that the vehicle can be stopped before said predetermined position.

14. A vehicular control system for detecting the road situation of a plan route to be followed by the vehicle and for executing controls including the control of an automatic transmission, mounted on the vehicle, on the basis of the road situations, comprising:

obstructing factor detecting means for detecting the presence of factors for obstructing the run of the vehicle on said plan route;

obstruction notifying means for notifying, when the presence of said factors is detected by said obstructing factor detecting means, a driver of the vehicle of the presence of said obstructing factors by controlling a drive state of said automatic transmission;

stop detecting means for detecting that the vehicle can be stopped at a predetermined position prior to reaching said obstructing factors;

braking means for executing the braking of the vehicle when it is not detected that the vehicle can be stopped before said predetermined position; and non-drive means for lowering the torque transmission in the automatic transmission to a neutral state when it is not detected that the vehicle can be stopped before said predetermined position.

15. A vehicular control system for detecting the road situations of a plan route to be followed by the vehicle and for executing controls including the control of an automatic transmission, mounted on the vehicle, on the basis of the road situations, comprising:

obstructing factor detecting means for detecting the presence of factors for obstructing the run of the vehicle on said plan route;

obstruction notifying means for notifying, when the presence of said factors is detected by said obstructing factor detecting means, a driver of the vehicle of the presence of said obstructing factors by controlling a drive state of said automatic transmission;

avoiding operation detecting means for detecting an operation to avoid the approach of the vehicle to said obstructing factors;

stop detecting means for detecting that the vehicle can be stopped at a predetermined position prior to reaching said obstructing factors; and braking means for executing the braking of the vehicle when it is not detected that the vehicle can be stopped before said predetermined position.

16. A vehicular control system according to claim 15, further comprising:

means for executing the shift of the automatic transmission repeadly so that the shock may gradually rise, when said avoiding operation detecting means fails to detect said avoiding operation.

17. A vehicular control system according to claim 15, wherein said avoiding operation detecting means includes means for detecting that at least one of the braking operation and a steering operation in the direction to avoid said obstructing factors.

18. A vehicular control system for detecting the road situations of a plan route to be followed by the vehicle and for executing controls including the control of an automatic transmission, mounted on the vehicle, on the basis of the road situations, comprising:

obstructing factor detecting means for detecting the presence of factors for obstructing the run of the vehicle on said plan route;

obstruction notifying means for notifying, when the presence of said factors is detected by said obstructing factor detecting means, a driver of the vehicle of the presence of said obstructing factors by controlling a drive state of said automatic transmission;

avoiding operation detecting means for detecting an operation to avoid the approach of the vehicle to said obstructing factors;

stop detecting means for detecting that the vehicle can be stopped at a predetermined position prior to reaching said obstructing factors; and non-drive means for lowering the torque transmission in the automatic transmission to a neutral state when it is not detected that the vehicle can be stopped before said predetermined position.

19. A vehicular control system for detecting the road situations of a plan route to be followed by the vehicle and for executing controls including the control of an automatic transmission, mounted on the vehicle, on the basis of the road situations, comprising:

obstructing factor detecting means for detecting the presence of factors for obstructing the run of the vehicle on said plan route;

obstruction notifying means for notifying, when the presence of said factors is detected by said obstructing factor detecting means, a driver of the vehicle of the presence of said obstructing factors by controlling a drive state of said automatic transmission;

avoiding operation detecting means for detecting an operation to avoid the approach of the vehicle to said obstructing factors;

stop detecting means for detecting that the vehicle can be stopped at a predetermined position prior to reaching said obstructing factors;

braking means for executing the braking of the vehicle when it is not detected that the vehicle can be stopped before said predetermined position; and non-drive means for lowering the torque transmission in the automatic transmission to a neutral state when it is not detected that the vehicle can be stopped before said predetermined position.

20. A vehicular control system for detecting the road situations of a plan route to be followed by the vehicle and for executing controls including the control of an automatic transmission, mounted on the vehicle, on the basis of the road situations, comprising:

obstructing factor detecting means for detecting the presence of factors for obstructing the run of the vehicle on said plan route;

obstruction notifying means for notifying, when the presence of said factors is detected by said obstructing factor detecting means, a driver of the vehicle of the presence of said obstructing factors by controlling a drive state of said automatic transmission; and power-ON detecting means for detecting the power-On state in which the automatic transmission is driven by the torque which is inputted from an engine of the vehicle, wherein said obstructing factor detecting means includes means for lowering the torque transmission in the automatic transmission to a neutral state when it detects the presence of said obstructing factors and said power-ON detecting means detects the power-ON state.

21. A vehicular control system for detecting the road situations of a plan route to be followed by the vehicle and for executing controls including the control of an automatic transmission, mounted on the vehicle, on the basis of the road situations, comprising:

obstructing factor detecting means for detecting the presence of factors for obstructing the run of the vehicle on said plan route;

obstruction notifying means for notifying, when the presence of said factors is detected by said obstructing factor detecting means, a driver of the vehicle of the presence of said obstructing factors by controlling a drive state of said automatic transmission; and power-ON detecting means for detecting the power-On state in which the automatic transmission is driven by the torque which is inputted from an engine of the vehicle, wherein said obstructing factor detecting means includes means for executing a downshift and an upshift consecutively in the automatic transmission when the obstructing factor detecting means detects the presence of said obstructing factors and said power-ON detecting means fails to detect the power-ON state.

22. A vehicular control system for detecting the road situations of a plan route to be followed by the vehicle and for executing controls including the control of an automatic transmission, mounted on the vehicle, on the basis of the road situations, comprising:

obstructing factor detecting means for detecting the presence of factors obstructing the run of the vehicle on said plan route; and obstruction notifying means for immediately notifying, every time that the presence of said factors is detected by said obstructing factor detecting means, a driver of the vehicle of the presence of said obstructing factors by controlling a drive state of said automatic transmission, to establish a change of vehicle behavior.

* * * * *

UNITED STATES PATENT AND TRADEMARK OFFICE
CERTIFICATE OF CORRECTION

PATENT NO. : 6,014,605

DATED : January 11, 2000

INVENTOR(S): KUNIO MORISAWA ET AL

It is certified that an error appears in the above-identified patent and that said Letters Patent is hereby corrected as shown below:

Claim 7, line 6, after "detecting means for" insert --detecting--.

Claim 8, line 3, after "executing controls" delete --in--.

Claim 10, line 20, delete "troque" and insert --torque--.

Claim 14, line 2, delete "situation" and insert --situations--.

Claim 16, line 4, delete "repeadly" and insert --repeatedly--.

Claim 22, line 7, after "of factors" insert --for--.

Signed and Sealed this

Tenth Day of October, 2000

Attest:

Q. TODD DICKINSON

*Attesting Officer*          *Director of Patents and Trademarks*